UNITED STATES PATENT OFFICE.

BERTRAM HUNT, OF SAN FRANCISCO, CALIFORNIA.

PROCESS OF PRECIPITATING AND RECOVERING PRECIOUS METALS FROM THEIR SOLUTIONS.

SPECIFICATION forming part of Letters Patent No. 689,190, dated December 17, 1901.

Application filed August 15, 1900. Serial No. 26,913. (No specimens.)

*To all whom it may concern:*

Be it known that I, BERTRAM HUNT, a citizen of Scotland, residing in the city and county of San Francisco, State of California, have invented an Improvement in the Process of Precipitation and Recovery of Precious Metals from Their Solutions; and I hereby declare the following to be a full, clear, and exact description of the same.

My invention relates to a process for the precipitation and extraction of precious metals from their solutions.

It consists of mixing with the cyanid solution, first, the powdered ore or pulp; second, powdered aluminium, and, third, mercury, and the continuous agitation of these mixtures during each and all of the stages, and of details to be more fully set forth in the following specification.

First. The ore, pulp, or other material in finely-powdered form is agitated with a cyanid solution of suitable strength until the metal to be extracted is dissolved. If necessary, lime is added, as is desirable under certain conditions. In the usual cyanid processes the gold-containing solution is now separated from the tailings and the gold precipitated from the clear solution.

Second. In my process I continue the operation first begun by next adding to the pulp powdered metallic aluminium and keeping up a constant agitation of the mixture. The quantity of aluminium to be added depends upon the richness of the ore, strength of solution, and other conditions determined by experiment. The purpose of this step is seen in the following reaction that takes place:

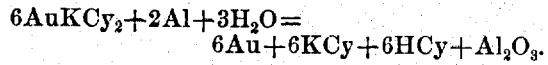

$$6AuKCy_2 + 2Al + 3H_2O = 6Au + 6KCy + 6HCy + Al_2O_3.$$

In presence of alkali the hydrocyanic acid of course re-forms alkaline cyanid. The gold is now precipitated, but in suspension in the pulp.

Third. To this pulp mercury is added and the agitation continued vigorously until all the metal is in the form of an amalgam. The metal is subsequently recovered by retorting the amalgam or treating it by other known and suitable means. The cyanid solution may now be separated from the tailings, returned for use again, and strengthened in any way desired.

This process may have its various stages operated intermittently, or its action may be made continuous, as in the case of a stamp or other wet crushing mill. In this the cyanid solution can be fed directly into the mortar-box with the ore. The pulp then passes in a continuous stream through a series of agitators till the dissolution of the precious metals is complete, then through another series, into which powdered metallic aluminium is continuously fed, and thence through another series of agitators containing mercury, where all the metals are taken up in the form of amalgam. The tailings and other residue flow on into settling-tanks or filter-presses or other suitable devices.

The number of agitators, amalgamating-pans, and settlers is proportionate to the amount of material treated, so as to give in each stage of the operation sufficient agitation and time to complete the reactions and combinations.

Having thus described my invention, what I claim as new, and desire to secure by Letters Patent, is—

1. The process of precipitating precious metals from a cyanid solution consisting of adding to said solution finely-divided metal aluminium, then adding mercury to the pulp and agitating the pulp until the metal is in the form of an amalgam, and finally recovering the metal by treating the amalgam.

2. The process of precipitating precious metals consisting of adding to the pulp a cyanid solution and agitating the same, until the metal is extracted; then adding to the pulp while continuing the agitation thereof, powdered metallic aluminium whereby the precious metal is precipitated, but in suspension in the pulp; then adding mercury and continuing the agitation until the metal is in the form of an amalgam, and finally recovering the precious metal by treating the amalgam.

In witness whereof I have hereunto set my hand.

BERTRAM HUNT.

Witnesses:
S. H. NOURSE,
CHAS. E. TOWNSEND.